United States Patent Office 3,127,391
Patented Mar. 31, 1964

3,127,391
AZO PIGMENT
Arthur S. Neave, Jr., Sycamore Township, Hamilton County, and Nathan N. Crounse, Cincinnati, Ohio, assignors to Sterling Drug Inc., New York, N.Y., a corporation of Delaware
No Drawing. Filed Jan. 11, 1962, Ser. No. 165,655
1 Claim. (Cl. 260—204)

This invention relates to monoazo pigment dyestuffs. More particularly, the present invention relates to a novel water-insoluble scarlet dyestuff having the structural formula

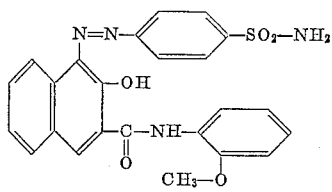

and having valuable properties as a pigment, particularly for textile printing.

Azo pigments obtained by coupling diazotized aromatic amines with arylides of 3-hydroxy-2-naphthoic acid and its analogs constitute a large and well-known class of compounds. During the course of many years of research on this class of pigments by a large number of investigators, only a small percentage of the numerous individual species which have been prepared have proved to possess sufficiently satisfactory properties to make them suitable for practical use in the coating art. At the same time, it has also been established that there is a tremendous variation among the combinations of properties, such as hue, brilliance, tinting value or strength, resistance to fading, wash fastness, and the like, so that despite the considerable previous work in this area persistent efforts to discover new and better pigments of this type have continued virtually unabated.

It is a particular object of the instant invention to provide a brilliant scarlet, water-insoluble pigment having low solubility in halohydrocarbon solvents of the type used in the dry-cleaning of fabrics, for instance perchloroethylene. Other objects and advantages of the invention will be apparent from the disclosure.

The new pigment of this invention is the water-insoluble product obtained by coupling diazotized sulfanilamide with 3-hydroxy-2-naphth-o-anisidide. Since the reaction temperature has some effect on the shade of the resulting water-insoluble pigment, it is ordinarily desirable to maintain adequate control of the temperature of the reaction mixture in some predetermined manner. It is satisfactory for most applications of the pigment product to stir the reactants together at a temperature in the approximate range 15–30° C. to effect only an incomplete coupling reaction, and then heat the mixture at a higher temperature, for instance in the approximate range 75–100° C., preferably at 95° C., to complete the coupling reaction and develop the pigment. The reaction is started in an alkaline aqueous medium, but the pH of the reaction mixture drops during the process to a final value of about 5.0.

The manner in which our new pigment is obtained is illustrated by the following example without, however, being limited thereto.

*Example*

A slurry of 120 pounds of sulfanilamide in 246 gallons of water and 338 pounds of 18° Bé hydrochloric acid was stirred at room temperature until all of the solid had dissolved. The temperature of the solution thus obtained was adjusted to 0° C. by addition of ice and the sulfanilamide was then diazotized by adding a solution of 49 pounds of sodium nitrite in 20 gallons of water. The reaction mixture was stirred at 0–5° C. for about one-half hour. The excess nitrite was then removed by addition of an aqueous solution of sulfamic acid until nitrite ion could no longer be detected by testing with starch-iodide paper, and the mixture was made neutral to Congo red test paper by addition of a cold (5° C.) solution of 140 pounds of sodium acetate in 30 gallons of water.

In a separate container, a slurry of 216 pounds of 3-hydroxy-2-naphth-o-anisidide in a mixture of 280 pounds of methyl alcohol, 118 pounds of 50 percent aqueous sodium hydroxide solution, and 260 gallons of water was heated at 80–90° C. until all of the solid had dissolved. This solution was added to 600 gallons of water at 25° C. To the solution obtained in this manner there was added rapidly and with stirring the cold (0° C.) reaction mixture containing the diazotized sulfanilamide prepared as described above. The resulting reaction mixture was stirred for one hour at 25° C. and then for one-half hour at 95° C., and afterward was diluted with sufficient cool water to lower the temperature of the mixture to 60° C. The mixture was filtered, washed with water until free of water-soluble chloride ion, and dried. There was thus obtained 333 pounds of scarlet solid. It melted at 285–290° C. with decomposition when heated at the rate of 10 degrees per minute. This product was the monoazo dyestuff having the structural formula

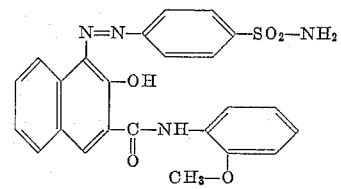

It was insoluble in water, dilute aqueous sodium hydroxide solution, and perchloroethylene, and was slightly soluble in boiling N,N-dimethylformamide.

The novel pigment of this invention obtained as described above was evaluated in the following manner as a pigment for use in textile printing.

An aqueous dispersion of the new pigment was prepared by dispersing an undried press cake of the pigment in water containing the sodium salt of a formaldehyde-naphthalene-sulfonic acid condensation product in the amount of 3–7 percent of the calculated weight of dry pigment in the press cake. To produce a concentrated color base, 100 parts of the water dispersion thus prepared and containing 20–25 percent by weight of the new pigment was emulsified with 100 parts of an emulsifiable vehicle composed of: 4 parts of a 50 percent solution of unmodified butylated melamine-formaldehyde resin (Resimine 875-Monsanto) in a mixture of equal parts of butanol and xylene; 13 parts of dipentene; 0.6 part of ethyl cellulose N-22; and 2.4 parts of isooctyl alcohol. One part of the water-in-oil emulsion thus obtained was mixed, using a high speed mixer, with 10 parts of a textile printing clear (water-in-oil type) to produce a 1 to 10 cut printing paste. By mixing one part of the 1 to 10 cut printing paste with 10 parts of the printing clear, a 1 to 100 cut printing paste was produced. The printing pastes were then printed on cloth, using a standard laboratory textile printing machine. The printed cloths were then examined and tested using standard procedures, with respect to the following: shade, resistance to fading, and resistance to loss of color value on dry cleaning with perchloroethylene (using AATCC colorfastness to dry cleaning tentative test method 85-1960), three requirements which were considered as essential to be met by a satisfactory product; brilliance; tinting value (strength); wash-fast properties (resistance to bleeding, or loss of color); resistance to strong alkali; resistance to chlorine; and resistance to discharge effect of hydrosulfite. The results of this evaluation were as follows. The prints obtained were scarlet in shade and well within the range of shades satisfactory to textile printers, had very good resistance to fading, and had excellent resistance to dry-cleaning with perchloroethylene, thus satisfying all three of the requirements considered as essential; were very brilliant and strong; had excellent wash-fastness; had excellent resistance to strong alkali; had good resistance to chlorine; and had excellent resistance to color discharge by hydrosulfite.

The foregoing results established that the novel monoazo dyestuff of this invention has highly valuable properties adapting it particularly to use as a pigment in textile printing.

We claim:

The water-insoluble monoazo dyestuff having the structural formula:

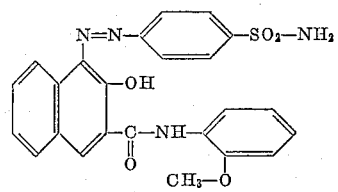

References Cited in the file of this patent

UNITED STATES PATENTS

| | | |
|---|---|---|
| 2,025,582 | Fischer | Dec. 24, 1935 |
| 2,210,072 | Fischer | Aug. 6, 1940 |